US012617058B2

(12) United States Patent
Rayas et al.

(10) Patent No.: US 12,617,058 B2
(45) Date of Patent: May 5, 2026

(54) SYSTEMS AND METHODS FOR AUTOMATED CLEANING OF MOBILE USER DEVICES

(71) Applicant: Verizon Patent and Licensing Inc., Basking Ridge, NJ (US)

(72) Inventors: Thomas David Rayas, Austin, TX (US); Ronald Wayne Fleck, Jr., Fort Worth, TX (US); Carolina Herrera, Arlington, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 457 days.

(21) Appl. No.: 18/303,500

(22) Filed: Apr. 19, 2023

(65) Prior Publication Data

US 2024/0351165 A1     Oct. 24, 2024

(51) Int. Cl.
B24C 1/00      (2006.01)
B08B 7/00      (2006.01)
B23Q 5/22      (2006.01)
B24C 3/12      (2006.01)

(52) U.S. Cl.
CPC ................ B24C 1/003 (2013.01); B08B 7/00 (2013.01); B23Q 5/22 (2013.01); B24C 3/12 (2013.01)

(58) Field of Classification Search
None
See application file for complete search history.

(56) References Cited

U.S. PATENT DOCUMENTS 5,989,355 A * 11/1999 Brandt .................... B24C 1/003
                                                            134/21

FOREIGN PATENT DOCUMENTS

DE       102015121603 A1 * 6/2017 ............. B24C 3/086
KR           101457886 B1 * 11/2014 ............. F26B 21/002
KR        20210072961 A  *  6/2021 ............. B08B 5/023

OTHER PUBLICATIONS

Machine translation: DE102015121603; Kocak, M. (Year: 2017).*
Machine translation: KR20210072961; Lee, J. (Year: 2021).*
Machine translation: KR101457886; Kim, J. (Year: 2014).*

* cited by examiner

*Primary Examiner* — Natasha N Campbell

(57)                    ABSTRACT

A cleaning station may include an input nest that receives a device and transfers the device to a first rotation nest. The first rotation nest may position the device under a first nozzle and rotational nozzles. The first nozzle may clean a first face of the device with dry ice pellets, and the rotational nozzles may clean a first pair of sides of the device with dry ice pellets. The first rotation nest may rotate the device ninety degrees, and the rotational nozzles may clean a second pair of sides of the device with dry ice pellets. A second rotation nest may remove the device from the first rotation nest and may position the device over a second nozzle. The second nozzle may clean a second face of the device with dry ice pellets, and the second rotation nest may transfer the device to an output nest.

20 Claims, 17 Drawing Sheets

116 ➔

126 Input nest
128 Output nest
130 Upper rotation nest
132 Vacuum nest
136 Bidirectional nozzle assembly
124 Base pneumatic slide
122 Plate nest support stage
134 Lower rotation nest

100

106 Hose assembly

102 Carbon dioxide dry ice blasting machine

104 Dust collection system

110 Blast diverters

108 Cleaning station

112 Main frame assembly

Right

Front

Left

136 Bidirectional nozzle assembly

130 Upper rotation nest

132 Vacuum nest

128 Output nest

126 Input nest

134 Lower rotation nest

122 Plate nest support stage

124 Base pneumatic slide

116

136
Bidirectional
nozzle assembly

140
Rotational nozzles

138
Upper blast nozzle

116

138
Upper blast nozzle

144
Air filter

142
Lower blast nozzle

116

116

146
Defrost heater
assembly

122
Plate nest support
stage

User device
148

200 ⟶

205

Receive a mobile user device cleaning recipe associated with cleaning a dirty mobile user device and clean the dirty mobile user device based on the mobile user device cleaning recipe User device 148

Dirty mobile user device

200

MOBILE USER DEVICE CLEANING RECIPE

GENERAL DATA

| | |
|---|---|
| Recipe Name: | Recipe #1 |
| File Time: | 8/9/2022  10:24 AM |
| Comments: | None |

RECIPE DATA

| | |
|---|---|
| Movement speed pass one: | 22 |
| Movement speed pass two: | 45 |
| Movement speed pass three: | 300 |
| Side nozzle clearance space: | 18 |
| Blast pressure pass one: | 3 |
| Blast pressure pass two: | 3 |
| Blast pressure pass three: | 2 |
| Pellet size pass one: | 2.5 |
| Pellet size pass two: | 3 |
| Pellet size pass three: | 1.5 |
| Feed rate pass one: | 1.35 |
| Feed rate pass two: | 1.35 |
| Feed rate pass three: | 1.35 |

Dirty mobile user device enters the table top assembly of the cleaning station via the plate nest support stage that slides in and out of the cleaning station along the base pneumatic slide, and the input nest receives the dirty mobile user device Dirty mobile user device 126 Input nest 122 Plate nest support stage 124 Base pneumatic slide

200

215

The vacuum nest travels on an axis to retrieve the dirty mobile user device from the input nest and transfers the dirty mobile user device to the lower rotation nest which travels on an axis to receive the dirty mobile user device 132
Vacuum nest Dirty mobile user device 134
Lower rotation nest 126
Input nest

220

The lower rotation nest travels with the dirty mobile user device from left to right under the bidirectional nozzle assembly, which simultaneously cleans a face of the mobile user device with the upper blast nozzle and sides of the mobile user device with the rotational nozzles

200

136
Bidirectional nozzle assembly

138
Upper blast nozzle

140
Rotational nozzles

Dirty mobile user device

134
Lower rotation nest

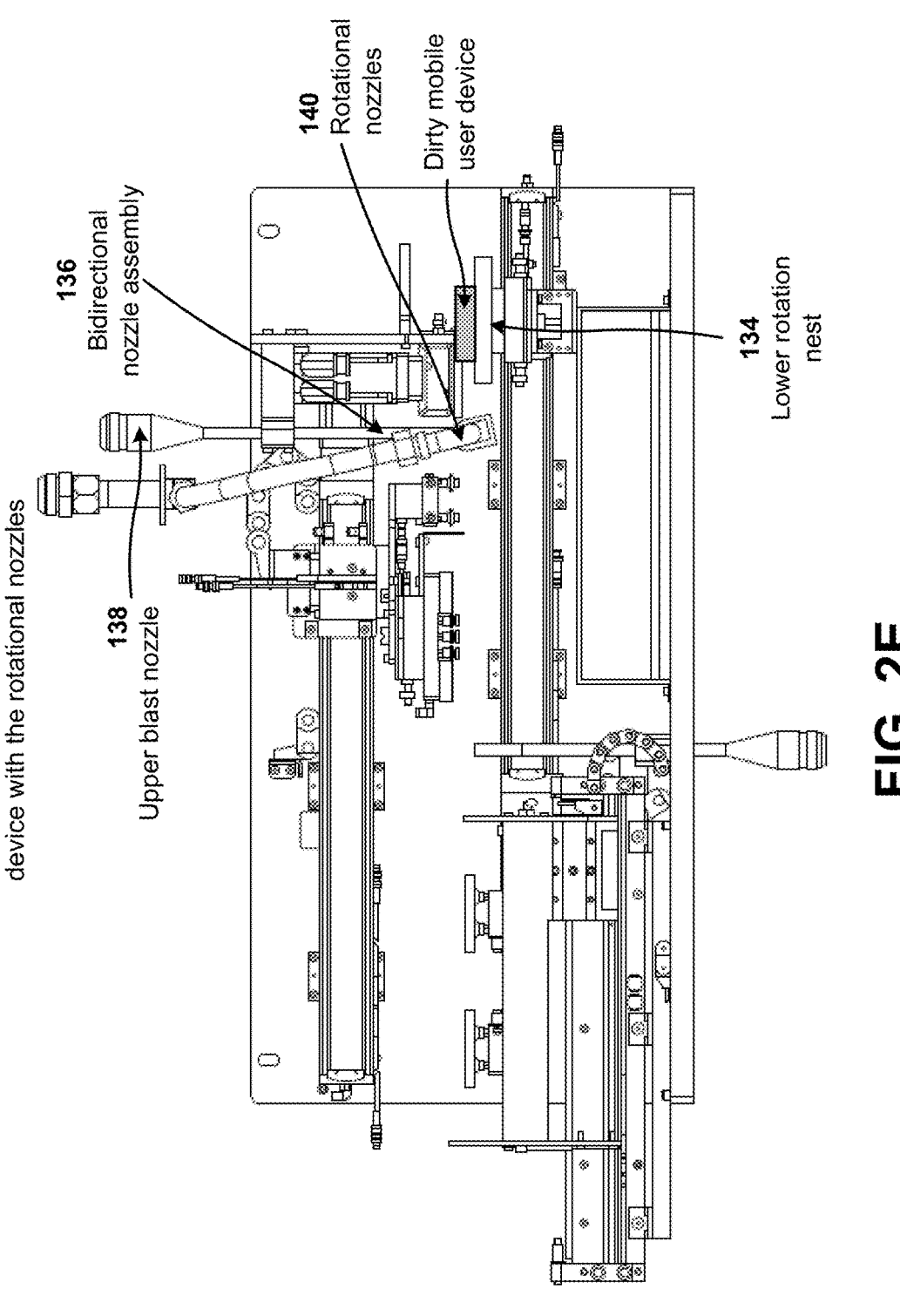

After completing a pass under the bidirectional nozzle assembly, the lower rotation nest rotates ninety degrees and travels from right to left under the bidirectional nozzle assembly again, with only the rotational nozzles active, which cleans the other two sides of the mobile user device

200

136
Bidirectional nozzle assembly

140
Rotational nozzles

Mobile user device

134
Lower rotation nest

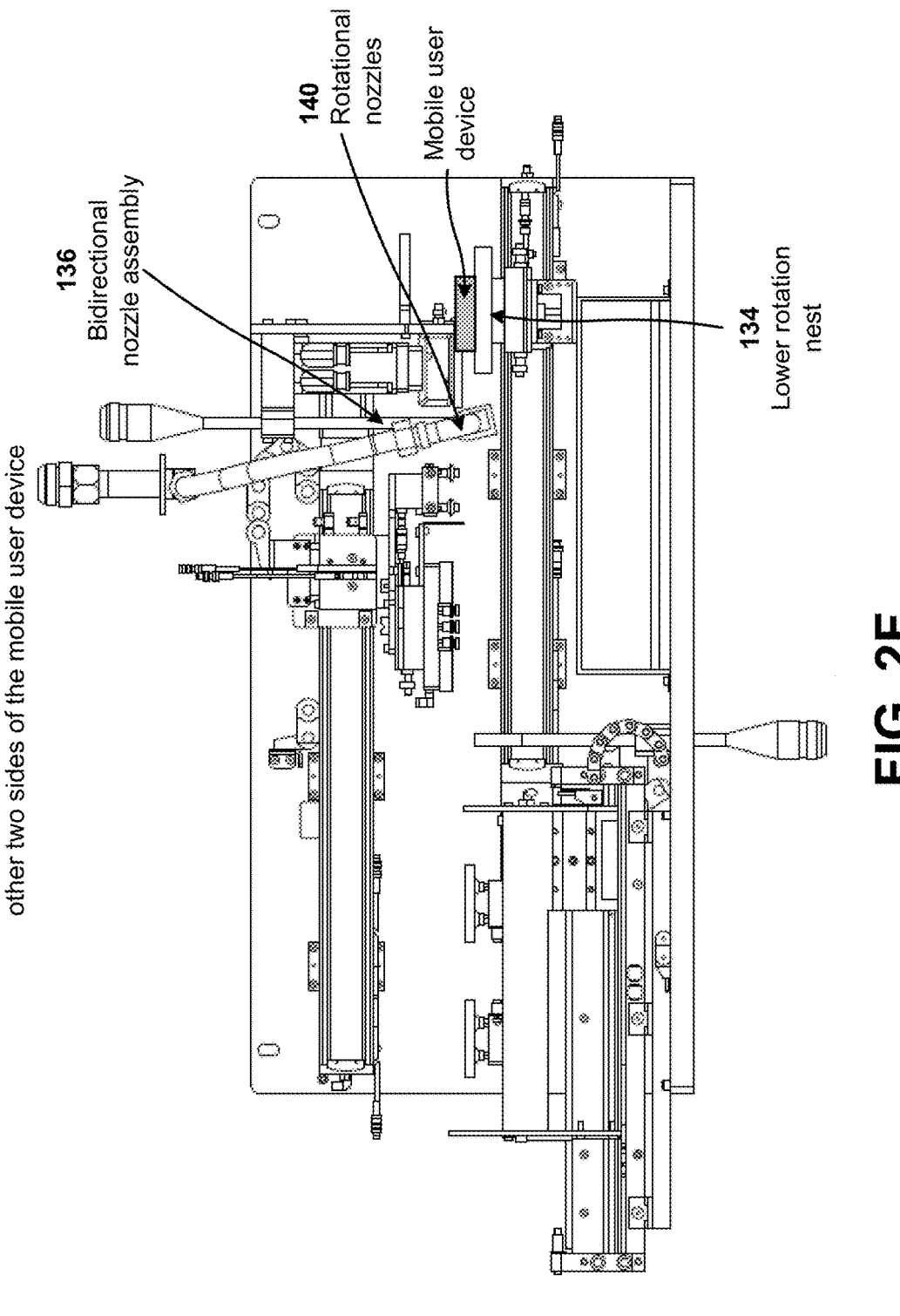

The upper rotation nest removes the mobile user device from the lower rotation nest and travels to the left, over the lower blast nozzle, which cleans the back face of the mobile user device, and deposits the cleaned mobile user device on the output nest 130
Upper rotation nest 134
Lower rotation nest 142
Lower blast nozzle 128
Output nest Cleaned mobile user device

235

100

As the plate nest support stage exits the system, the mobile user device passes under the defrost heater assembly, which blows hot air on the lower portion of the mobile user device, warming and drying the mobile user device in preparation for the application of a label. A robot retrieves the cleaned mobile user device and places another dirty mobile user device on the input nest and the cycle repeats.

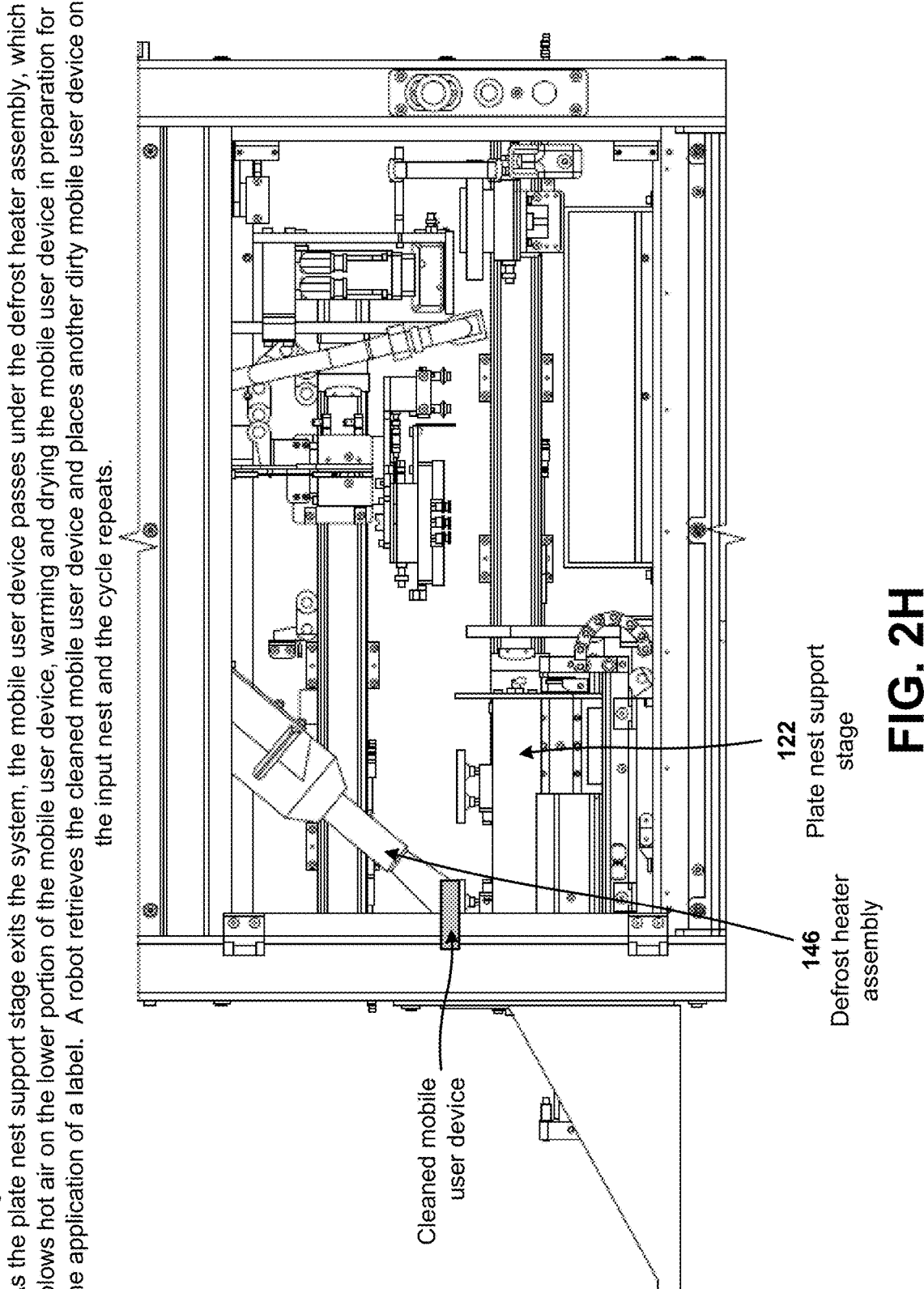

Cleaned mobile user device

146
Defrost heater assembly

122
Plate nest support stage

310
Mobile user device before processing with the cleaning station

320
Mobile user device after processing with the cleaning station

SYSTEMS AND METHODS FOR AUTOMATED CLEANING OF MOBILE USER DEVICES

BACKGROUND

Utilization of a mobile user device (e.g., a mobile telephone, a tablet computer, and/or the like) may cause the mobile user device to become soiled with dust, dirt, oils from human fingers or ears, and/or the like. The mobile user devices may also be contaminated with bacteria. For example, an average of seventeen thousand bacterial gene copies may be found on a single mobile user device.

BRIEF DESCRIPTION OF THE DRAWINGS

FIGS. 2A-2H are diagrams of an example associated with automated cleaning of mobile user devices with the cleaning system of FIGS. 1A-1F.

DETAILED DESCRIPTION OF EXAMPLE EMBODIMENTS

Figure 1A:
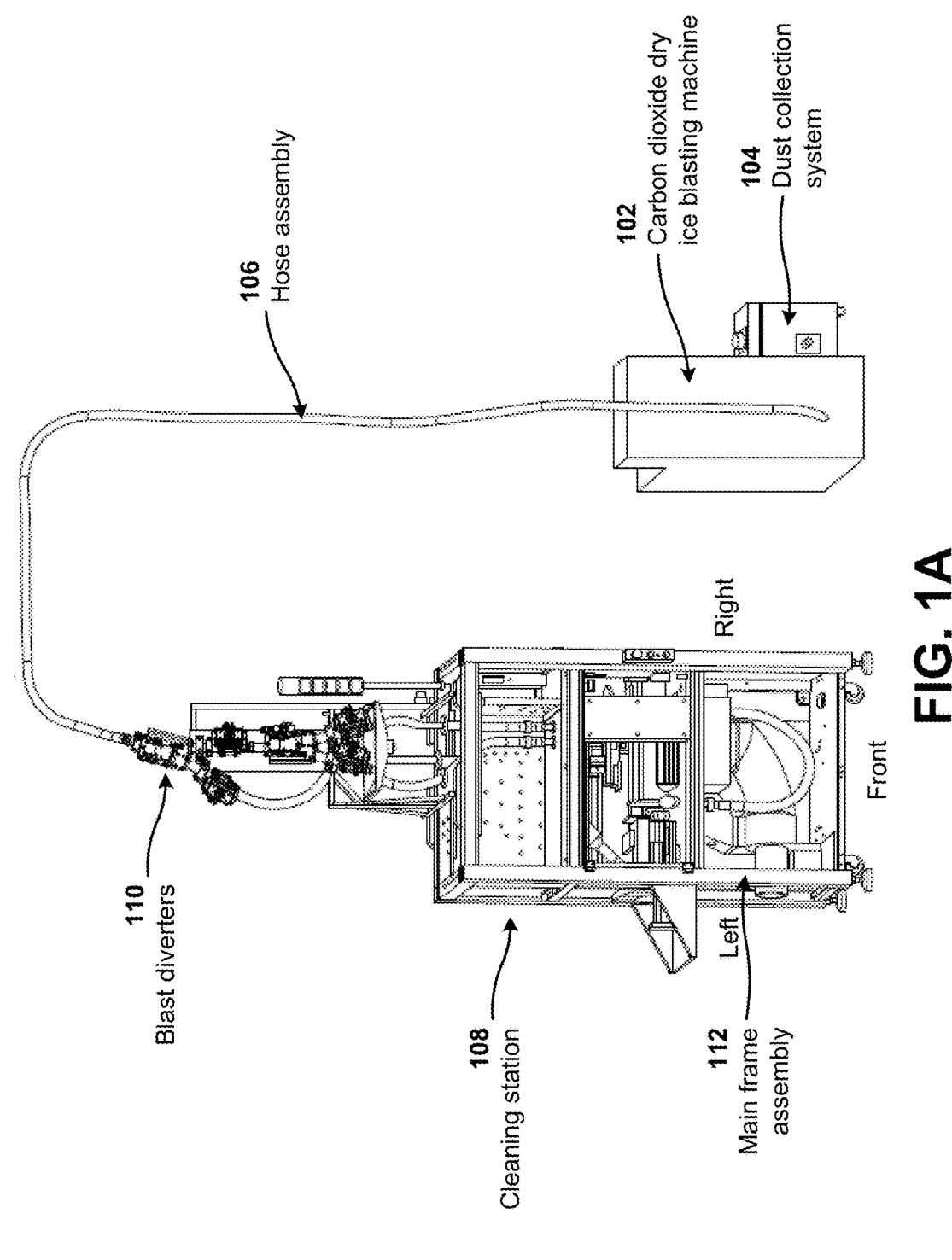
FIGS. 1A-1F are diagrams of an example automated cleaning system for mobile user devices.

The following detailed description of example implementations refers to the accompanying drawings. The same reference numbers in different drawings may identify the same or similar elements.

Contaminated mobile user devices may be cleaned and sanitized in a variety of ways, such as via manual cleaning techniques, semi-automated techniques, and/or the like. Manual cleaning techniques may include manual utilization of liquid cleaning solutions, plastic razors, brushes, microfiber cloths, and/or the like to clean mobile user devices. Such techniques typically clean all six surfaces, ports, keys, seams, and/or the like of the mobile user devices. However, manual cleaning techniques are very time consuming, labor intensive, and expensive. Semi-automated techniques may include utilization of liquid cleaning solutions, microfiber cloths, sponges, paper towels, and/or the like to clean mobile user devices. However, such techniques fail to clean ports, keys, seams, and/or the like of the mobile user devices, fail to support cleaning of some models of mobile user devices, and are very time consuming and expensive. Thus, current techniques for cleaning mobile user devices consume computing resources (e.g., processing resources, memory resources, communication resources, and/or the like), machinery resources, and/or other resources associated with manually cleaning mobile user devices, failing to clean certain portions of ports, keys, seams, and/or the like of the mobile user devices, failing to support cleaning of some models of mobile user devices, and/or the like.

Some implementations described herein provide a cleaning station that provides automated cleaning of mobile user devices. For example, the cleaning station may include a plate nest support stage that supports an input nest and an output nest and that slides in and out of the cleaning station. The input nest may receive a mobile user device, and a vacuum nest may retrieve the mobile user device from the input nest and may transfer the mobile user device to a first rotation nest of the cleaning station. The first rotation nest may position the mobile user device under a bidirectional nozzle assembly of the cleaning station, and a first blast nozzle, of the bidirectional nozzle assembly, may clean, based on a cleaning recipe, a first face of the mobile user device with dry ice pellets. A pair of rotational nozzles, of the bidirectional nozzle assembly, may clean a first pair of sides of the mobile user device with dry ice pellets, and the first rotation nest may rotate the mobile user device ninety degrees. The pair of rotational nozzles may clean a second pair of sides of the mobile user device with dry ice pellets, and a second rotation nest may remove the mobile user device from the first rotation nest and may position the mobile user device over a second blast nozzle of the cleaning station. The second blast nozzle may clean a second face of the mobile user device with dry ice pellets, and the second rotation nest may transfer the mobile user device to the output nest for removal from the cleaning station.

In this way, the cleaning station provides automated cleaning of mobile user devices. For example, the cleaning station may be designed to work with a robotic device and a carbon dioxide dry ice pellet source to clean mobile user devices. The dry ice pellet cleaning process utilized by the cleaning station may make the mobile user devices look brand new for reuse in a secondary mobile user device market. Thus, the cleaning station may conserve computing resources, machinery resources, and/or other resources that would have otherwise been consumed by manually cleaning mobile user devices, failing to clean certain portions of ports, keys, seams, and/or the like of the mobile user devices, failing to support cleaning of some models of mobile user devices, and/or the like.

FIGS. 1A-1F are diagrams of an example 100 associated with automated cleaning of mobile user devices. As shown in FIGS. 1A-1F, example 100 includes a cleaning system with a carbon dioxide dry ice blasting machine 102, a dust collection system 104, a hose assembly 106, a cleaning station 108, blast diverters 110, and a main frame assembly 112 of the cleaning station 108. Further details of the carbon dioxide dry ice blasting machine 102, the dust collection system 104, the hose assembly 106, the cleaning station 108, the blast diverters 110, and the main frame assembly 112 are provided elsewhere herein.

The carbon dioxide dry ice blasting machine 102 may include a machine that receives liquid carbon dioxide and generates carbon dioxide dry ice pellets based on compressing and/or cooling the liquid carbon dioxide. In some implementations, sizes and feed rates of the carbon dioxide dry ice pellets may be determined based on a cleaning recipe provided to the carbon dioxide dry ice blasting machine 102 (e.g., from a user device, as described below). The carbon dioxide dry ice blasting machine 102 may cut dry ice into diamond-shaped particles in exact dimensions chosen by a user (e.g., greater than or equal to 0.3 millimeters (mm) and less than or equal to 3 mm), allowing the user to fine-tune blasting parameters for each application. The carbon dioxide dry ice blasting machine 102 may enable programmable application recipes, which allow users to set and save blasting parameters, such as blast pressure, particle size, and feed rate.

The dust collection system 104 may include a system that collects dust (e.g., dry ice dust) generated when the carbon dioxide dry ice blasting machine 102 cuts the dry ice into diamond-shaped particles in exact dimensions. The dust collection system 104 may store the collected dust until the dust is manually removed from the dust collection system 104. In some implementations, the dust collection system 104 may be associated with a vent that enables the dust to be transported to another location for removal.

The hose assembly 106 may include a hose that transports the carbon dioxide dry ice pellets from the carbon dioxide dry ice blasting machine 102 to the blast diverters 110. The hose assembly 106 may be sized and shaped to transport the carbon dioxide dry ice pellets from the carbon dioxide dry ice blasting machine 102 according to the blasting parameters, such as blast pressure, particle size, and feed rate.

The cleaning station 108 may include a device that provides automated cleaning of mobile user devices. For example, the cleaning station 108 may be designed to work with a robotic device (e.g., for transferring mobile user devices to and/or from the cleaning station 108) and the carbon dioxide dry ice blasting machine 102 to clean mobile user devices. The cleaning station 108 may utilize a dry ice pellet cleaning process to clean the mobile user devices and make the mobile user devices look brand new for reuse in a secondary mobile user device market.

The blast diverters 110 may include components that communicate with the hose assembly 106 and receive the carbon dioxide dry ice pellets from the hose assembly 106. The blast diverters 110 may divert the received carbon dioxide dry ice pellets to different portions of the main frame assembly 112 of the cleaning station 108 for cleaning mobile user devices.

The main frame assembly 112 may include a portion of the cleaning station 108 responsible for receiving the carbon dioxide dry ice pellets from the blast diverters 110 and utilizing the carbon dioxide dry ice pellets to clean mobile user devices. As further shown in FIG. 1A, the main frame assembly 112 may include a front portion, a left portion, and a right portion.

Figure 1B:
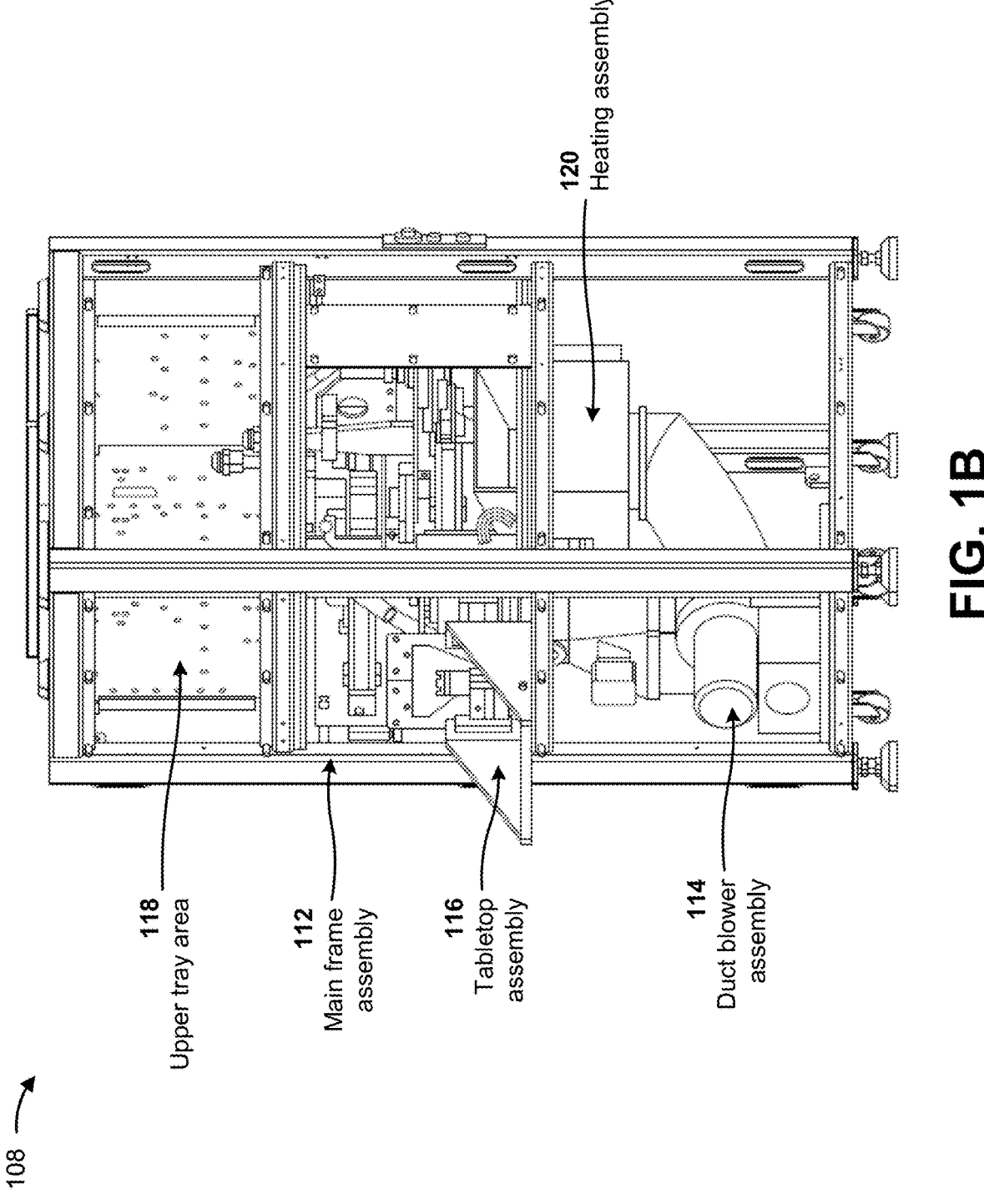

As shown in FIG. 1B, the main frame assembly 112 of the cleaning station 108 may include a duct blower assembly 114, a tabletop assembly 116, an upper tray area 118, and a heating assembly 120. The duct blower assembly 114 may include a mechanism (e.g., a blower and a duct) that recirculates air within the tabletop assembly 116. The tabletop assembly 116 may include a portion of the main frame assembly 112 responsible for receiving the carbon dioxide dry ice pellets from the blast diverters 110 and utilizing the carbon dioxide dry ice pellets to clean mobile user devices. The upper tray area 118 may include mechanisms that connect hoses from the blast diverters 110 to the tabletop assembly 116 so that the tabletop assembly 116 may receive and utilize the carbon dioxide dry ice pellets to clean mobile user devices. The heating assembly 120 may include a mechanism (e.g., a heater) that warms the air recirculated by the duct blower assembly 114 within the tabletop assembly 116.

Figure 1C:
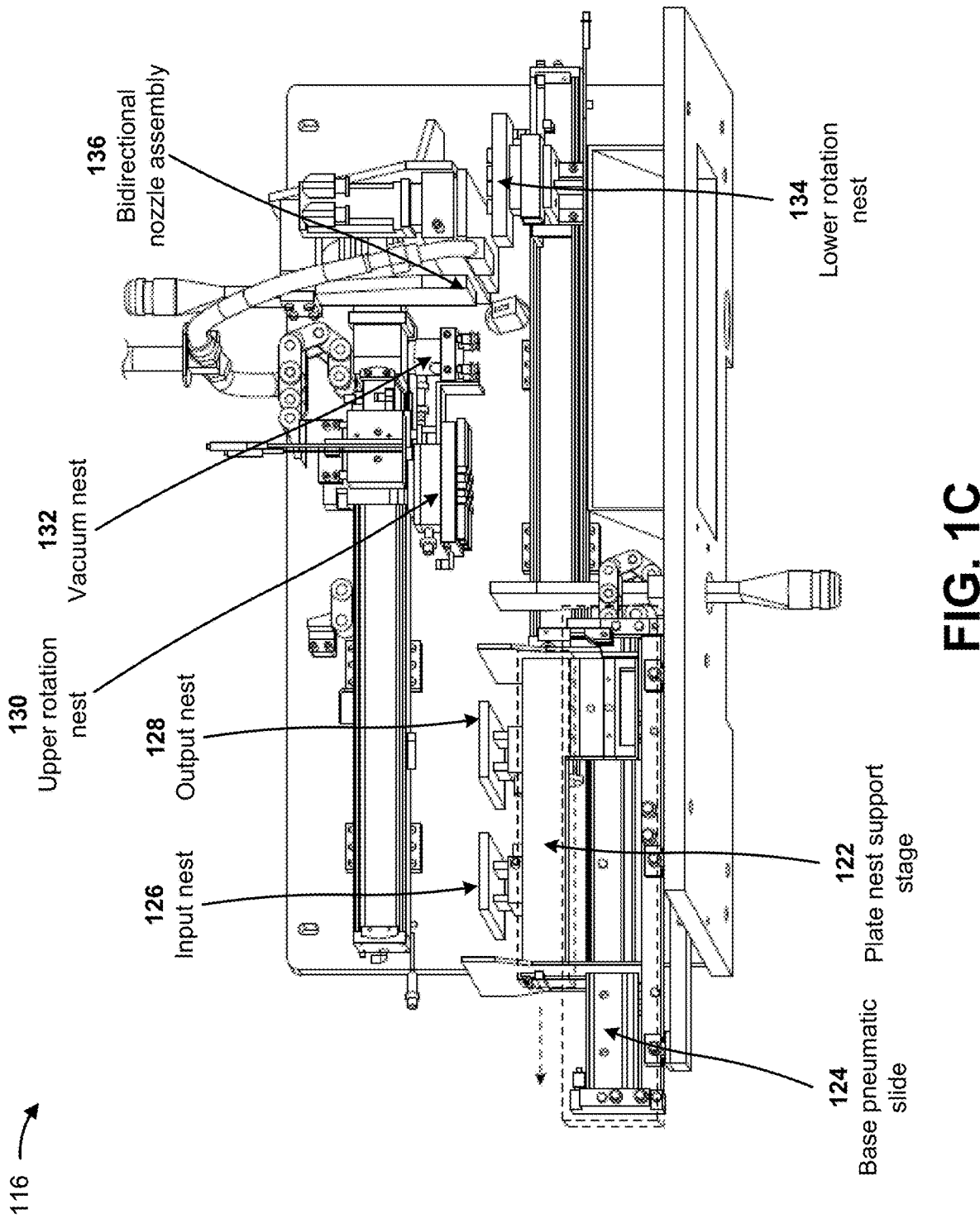

As shown in FIG. 1C, the tabletop assembly 116 may include a plate nest support stage 122, a base pneumatic slide 124, an input nest 126, an output nest 128, an upper rotation nest 130, a vacuum nest 132, a lower rotation nest 134, and a bidirectional nozzle assembly 136. The tabletop assembly 116 may include other components (e.g., robotics, motors, slides, etc.) that enable the tabletop assembly to manipulate and clean a mobile user device.

The plate nest support stage 122 may include a stage that connects to and supports the input nest 126 and the output nest 128. The plate nest support stage 122 may communicate with and travel along the base pneumatic slide 124 so that the plate nest support stage 122 may slide in and out of the tabletop assembly 116.

The base pneumatic slide 124 may include a rail, a guide, and/or the like that receives a portion of the plate nest support stage 122. The base pneumatic slide 124 may be provided partially within the tabletop assembly 116 and partially outside of the tabletop assembly 116 so that the plate nest support stage 122 may slide in and out of the tabletop assembly 116.

The input nest 126 may include a stage that supports a dirty mobile user device. In some implementations, when the plate nest support stage 122 exits the tabletop assembly 116, a robotic device (e.g., not shown) may place the dirty mobile user device on the stage of the input nest 126.

The output nest 128 may include a stage that supports a cleaned mobile user device. In some implementations, when the plate nest support stage 122 exits the tabletop assembly 116, a robotic device (e.g., not shown) may remove the cleaned mobile user device from the stage of the output nest 128.

The upper rotation nest 130 may include a rotatable stage with suction cups that retain the mobile user device against the stage. In some implementations, after a first face (e.g., a front face) of the mobile user device is cleaned, the upper rotation nest 130 may utilize the suction cups to retrieve the mobile user device from the lower rotation nest 134 and to retain the mobile user against the rotatable stage of the upper rotation nest 130. The upper rotation nest 130 may travel over a lower blast nozzle 142 (e.g., as shown in FIG. 1E) that cleans a second face (e.g., a back or rear face) of the mobile user device. The upper rotation nest 130 may then deposit the cleaned mobile user device on the stage of the output nest 128.

The vacuum nest 132 may include a stage with suction cups that retain the mobile user device against the stage. In some implementations, after the plate nest support stage 122 enters the tabletop assembly 116, the vacuum nest 132 may travel on its axis to retrieve the dirty mobile user device from the input nest 126 and transfer the dirty mobile user device to the lower rotation nest 134 (e.g., which may travel on its axis to meet the vacuum nest 132).

The lower rotation nest 134 may include a rotatable stage with suction cups that retain the mobile user device against the stage. The lower rotation nest 134 may move the mobile user device (e.g., from left to right or from right to left) under the bidirectional nozzle assembly 136, which simultaneously cleans the first face (e.g., the front face) and sides of the mobile user device.

Figure 1D:
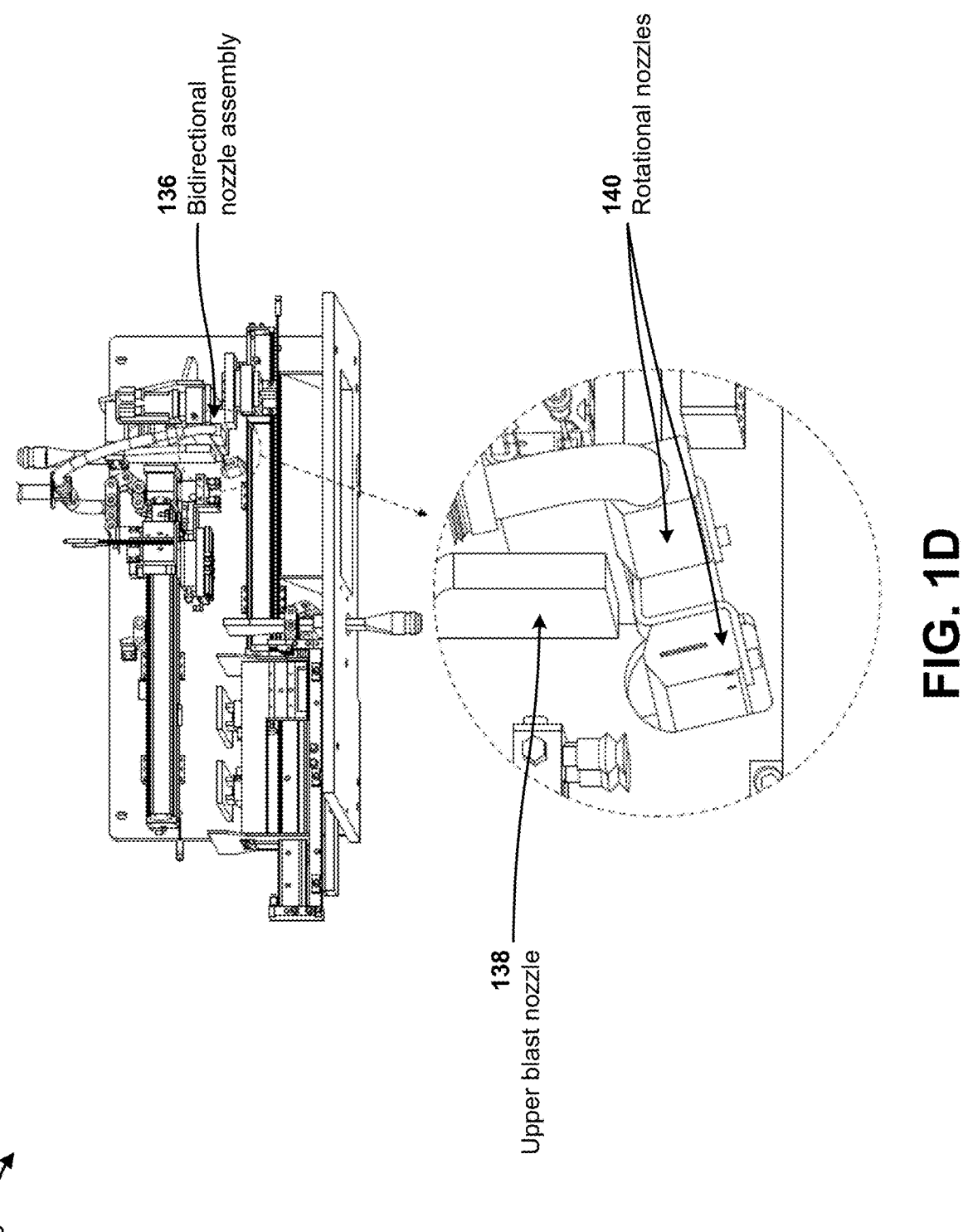
Figure 1E:
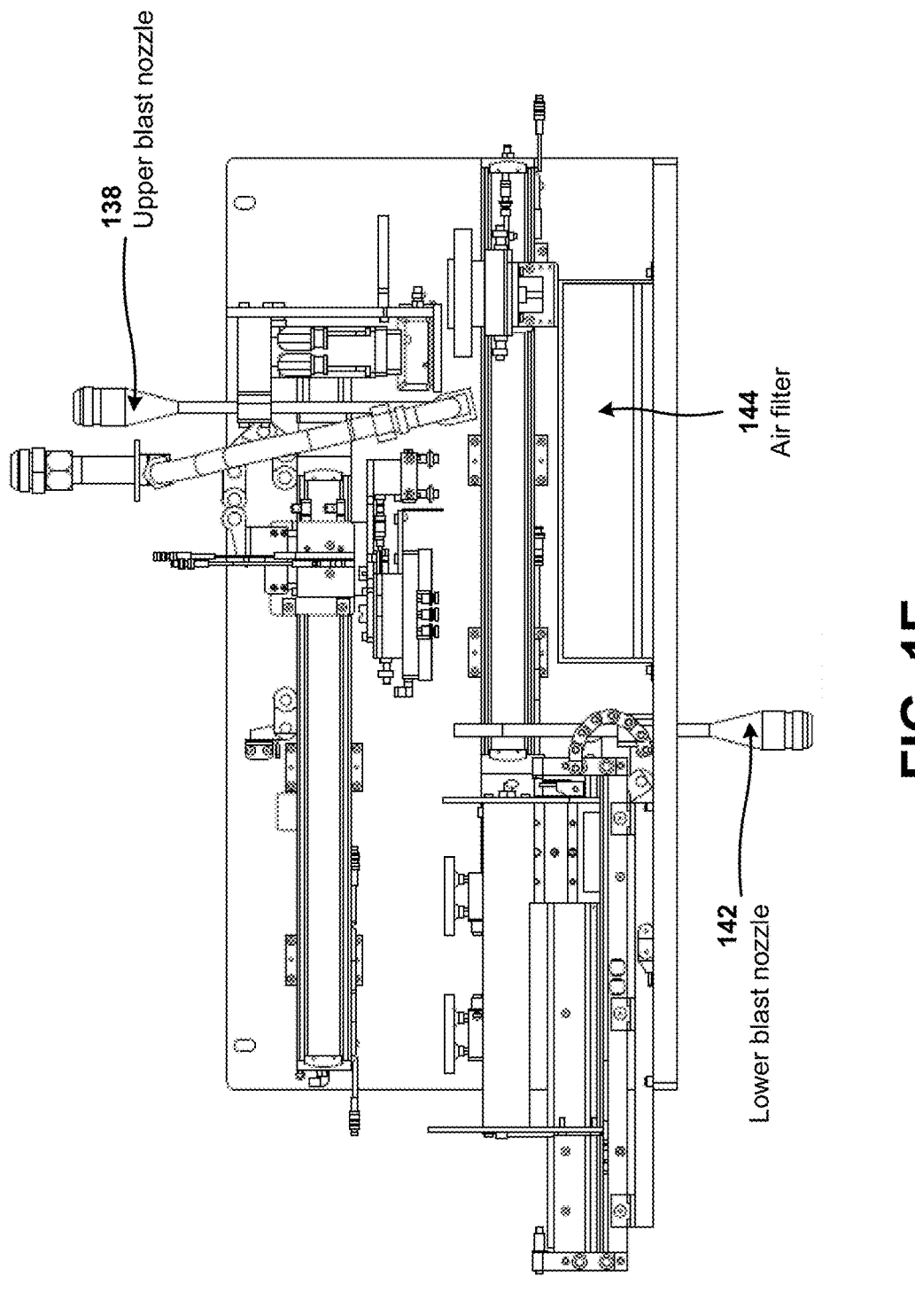

As shown in FIG. 1D, the bidirectional nozzle assembly 136 may include an upper blast nozzle 138 and rotational nozzles 140. When the lower rotation nest 134 moves the mobile user device (e.g., from left to right or from right to left) under the bidirectional nozzle assembly 136, the bidirectional nozzle assembly 136 may simultaneously clean the first face (e.g., the front face) with the upper blast nozzle 138 and sides of the mobile user device with the rotational nozzles 140. After the mobile user device completes a pass under the bidirectional nozzle assembly 136, the lower rotation nest 134 may rotate (e.g., ninety degrees) and may move the mobile user device (e.g., from left to right or from right to left) under the bidirectional nozzle assembly 136 again, with only the rotational nozzles 140 active, which cleans the other two sides of the mobile user device.

As shown in FIG. 1E, the tabletop assembly 116 may include the upper blast nozzle 138, the lower blast nozzle 142, and an air filter 144. The upper blast nozzle 138 and the lower blast nozzle 142 may communicate with the blast diverters 110 to receive the carbon dioxide dry ice pellets. The upper blast nozzle 138 may utilize the carbon dioxide dry ice pellets to clean the first face (e.g., the front face) of the mobile user device. The lower blast nozzle 142 may utilize the carbon dioxide dry ice pellets to clean the second face (e.g., the back or rear face) of the mobile user device. The air filter 144 may include a pleated panel air filter that filters debris associated with the cleaning operation (e.g., dirt, dust, dry ice debris, and/or the like).

Figure 1F:
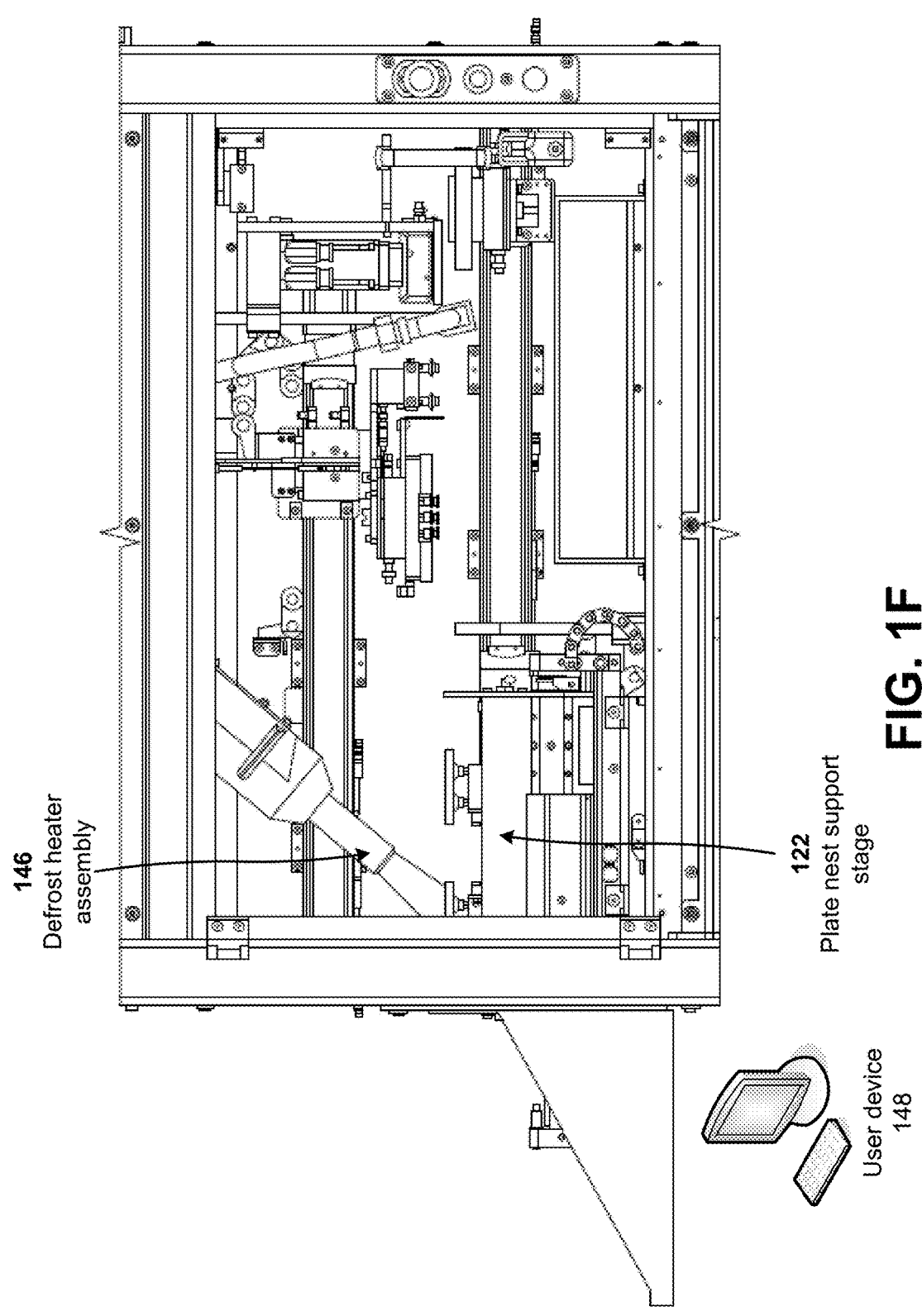

As shown in FIG. 1F, as the plate nest support stage 122 exits the tabletop assembly 116, the cleaned mobile user device may pass under a defrost heater assembly 146 that blows hot air on a lower portion of the cleaned mobile user device, warming and drying the cleaned mobile user device in preparation for application of a label following exit from the tabletop assembly 116. A robotic device may retrieve the cleaned mobile user device and may place another dirty mobile user device on the input nest 126 and the cycle repeats. As further shown in FIG. 1F, the tabletop assembly 116 (e.g., the cleaning station 108) may communicate with a user device 148 (e.g., a computer, a mobile device, a laptop computer, a tablet computer, and/or the like) that enables a user of the cleaning station 108 to input a cleaning recipe for mobile user devices to be cleaned. In some implementations, the user device 148 may also communicate with the carbon dioxide dry ice blasting machine 102 and/or the dust collection system 104.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2A:
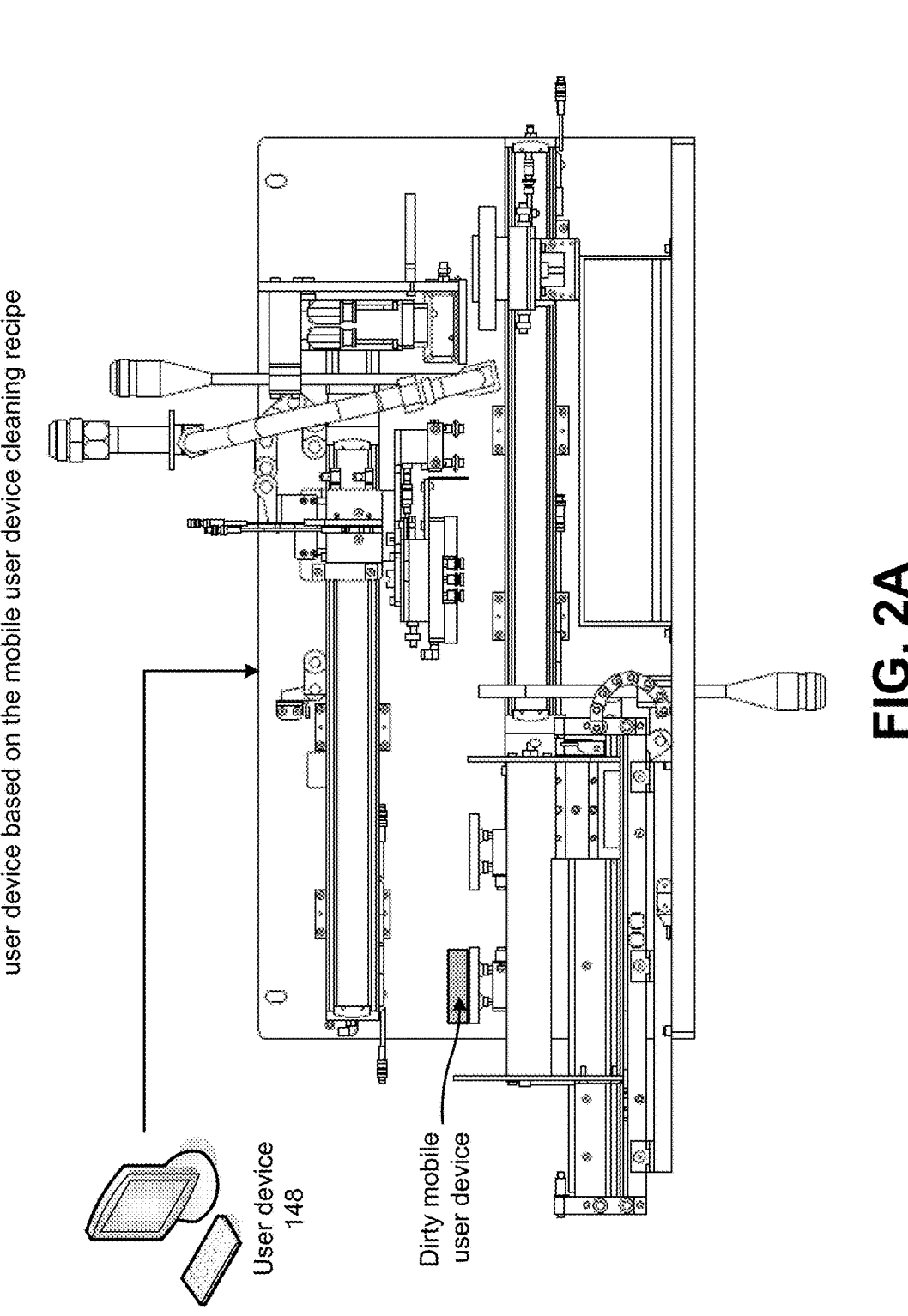

FIGS. 2A-2H are diagrams of an example 200 associated with automated cleaning of mobile user devices with the cleaning system of FIGS. 1A-1F. As shown in FIG. 2A, and by reference number 205, the cleaning station 108 may receive a mobile user device cleaning recipe associated with cleaning a dirty mobile user device, and may clean the dirty mobile user device based on the mobile user device cleaning recipe. In some implementations, a user of the cleaning station 108 may utilize the user device 148 to input the cleaning recipe, and the user device 148 may provide the cleaning recipe to the cleaning station 108. The cleaning station 108 may receive the cleaning recipe from the user device 148 and may clean the first mobile user device according to the cleaning recipe, as described below in connection with FIGS. 2B-2H.

As shown in FIG. 2B, the mobile user device cleaning recipe may include information associated with movement speeds (e.g., during pass one, pass two, and pass three) of the mobile user device under the bidirectional nozzle assembly 136; a clearance space of the pair of rotational nozzles 140; blast pressures (e.g., during pass one, pass two, and pass three) of the upper blast nozzle 138, the pair of rotational nozzles 140, and the lower blast nozzle 142; dry ice pellet sizes (e.g., during pass one, pass two, and pass three) provided by the upper blast nozzle 138, the pair of rotational nozzles 140, and the lower blast nozzle 142; dry ice pellet feed rates (e.g., during pass one, pass two, and pass three) provided to the upper blast nozzle 138, the pair of rotational nozzles 140, and the lower blast nozzle 142; and/or the like. In some implementations, the user may modify one or more parameters of the cleaning recipe based on a type of mobile user device to be cleaned, a dirtiness state of a mobile user device to be cleaned, and/or the like.

Figure 2C:
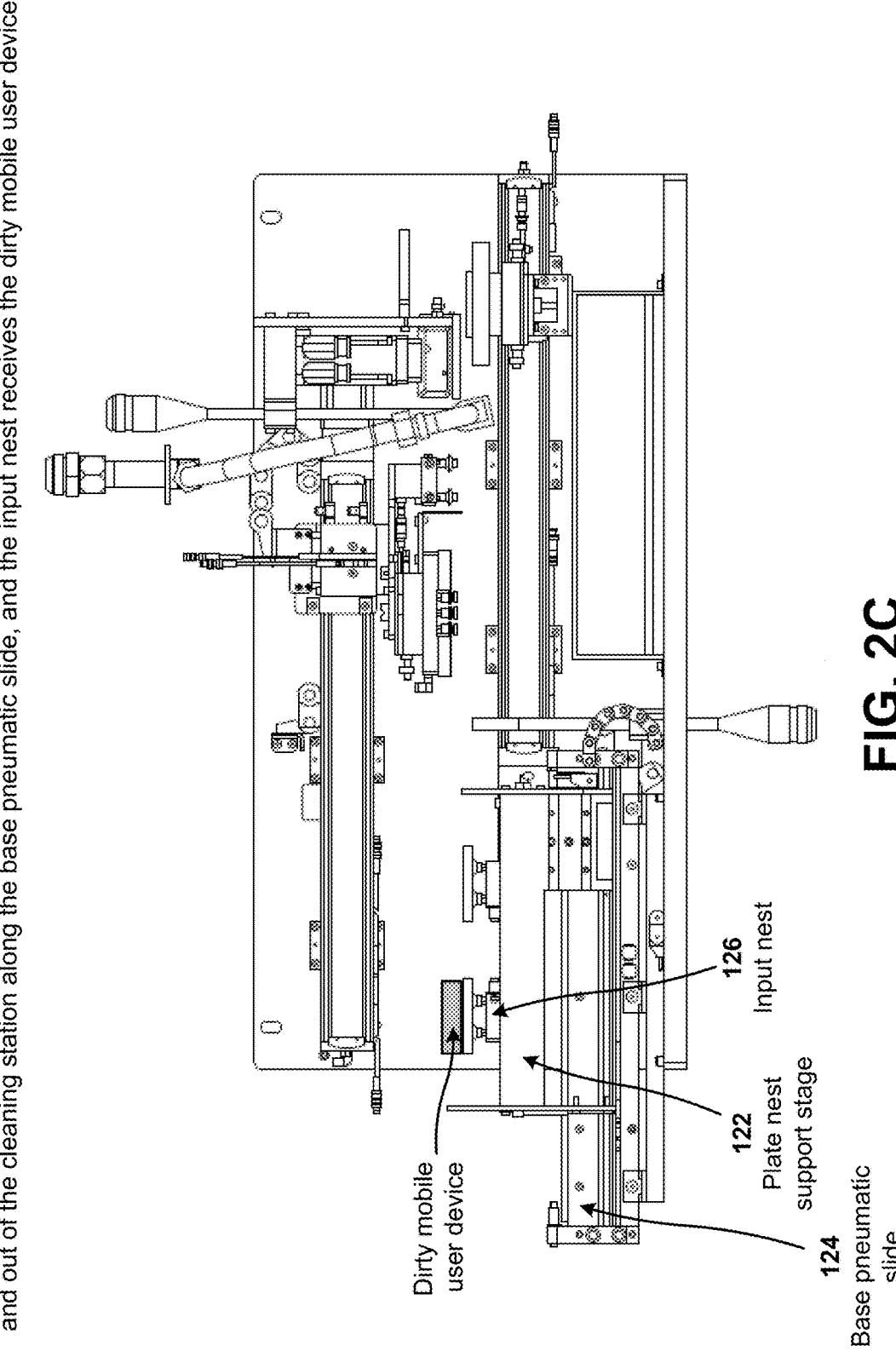

As shown in FIG. 2C, and by reference number 210, the dirty mobile user device enters the tabletop assembly 116 of the cleaning station 108 via the plate nest support stage 122 that slides in and out of the cleaning station 108 along the base pneumatic slide 124, and the input nest 126 receives the dirty mobile user device (e.g., from a robotic device).

Figure 2D:
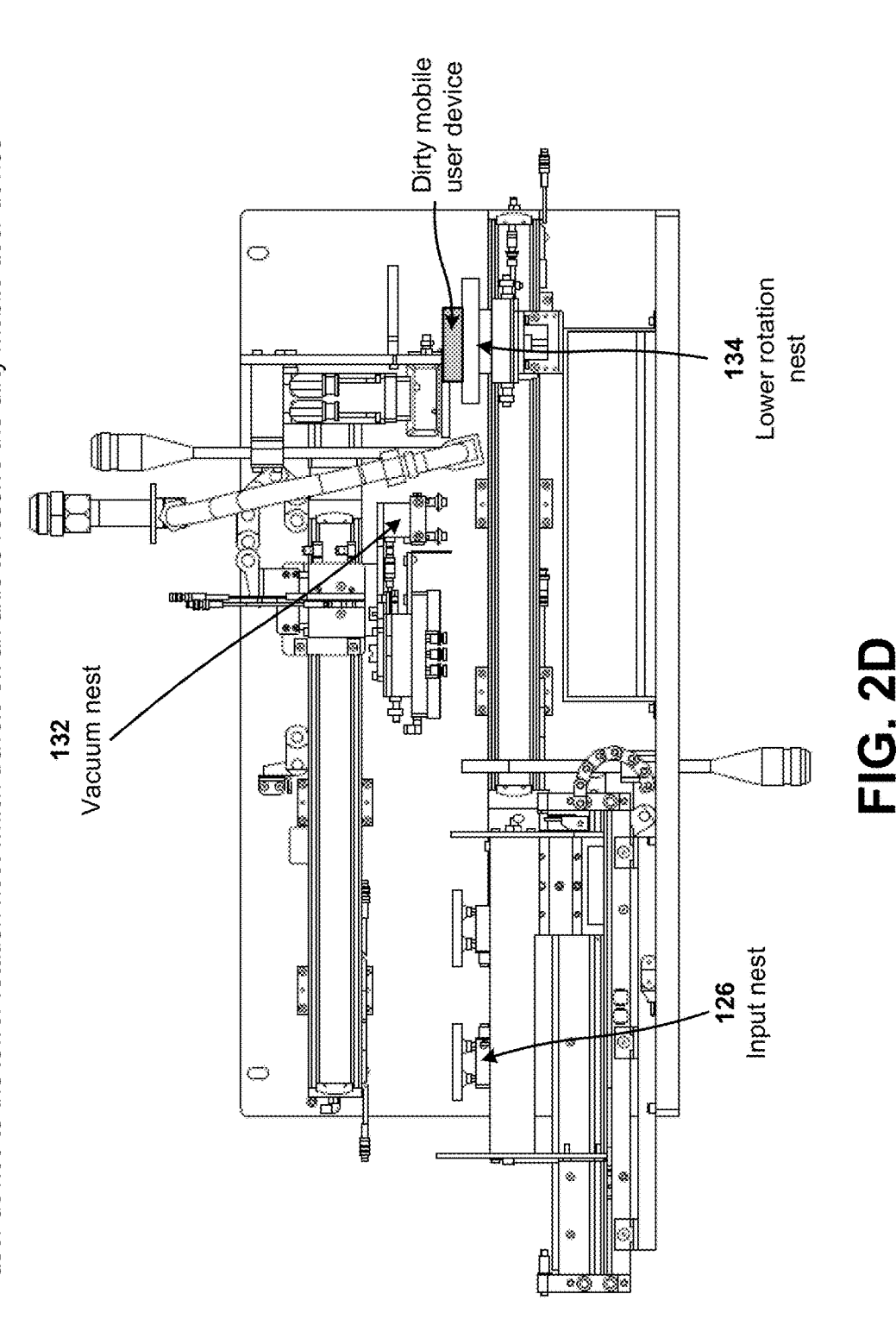

As shown in FIG. 2D, and by reference number 215, the vacuum nest 132 may travel on an axis to retrieve the dirty mobile user device from the input nest 126 and may transfer the dirty mobile user device to the lower rotation nest 134 which travels on an axis to receive the dirty mobile user device from the vacuum nest 132.

As shown in FIG. 2E, and by reference number 220, the lower rotation nest 134 may travel with the dirty mobile user device from left to right under the bidirectional nozzle assembly 136. The bidirectional nozzle assembly 136 may simultaneously clean a face (e.g., a front face) of the mobile user device with the upper blast nozzle 138 and sides of the mobile user device with the rotational nozzles 140.

As shown in FIG. 2F, and by reference number 225, after completing a pass under the bidirectional nozzle assembly 136, the lower rotation nest 134 may rotate ninety degrees and may travel from right to left under the bidirectional nozzle assembly 136 again, with only the rotational nozzles 140 active, which cleans the other two sides of the mobile user device.

Figure 2G:
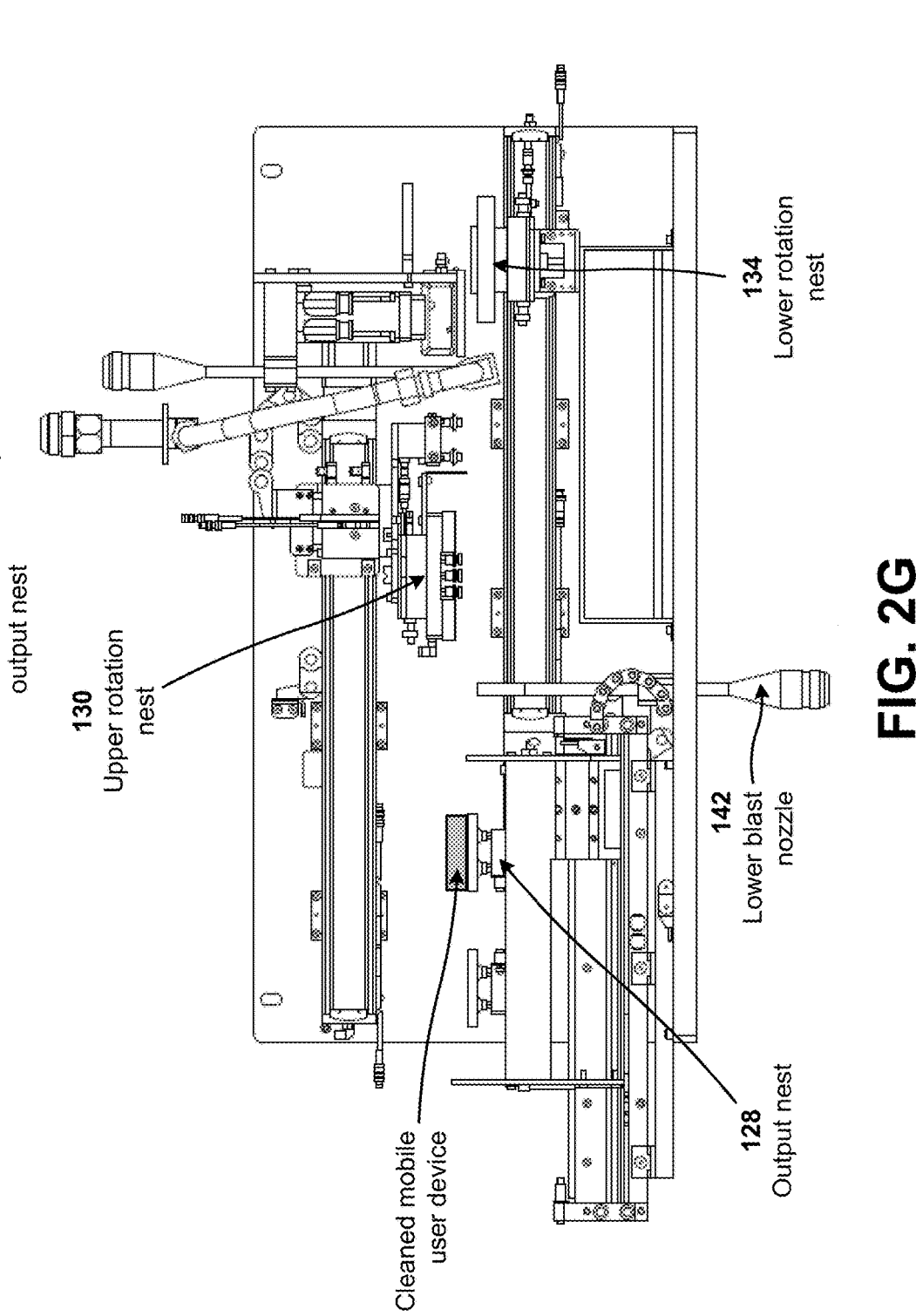

As shown in FIG. 2G, and by reference number 230, the upper rotation nest 130 may remove the mobile user device from the lower rotation nest 134 and may travel to the left, over the lower blast nozzle 142, which cleans the back or rear face of the mobile user device. The upper rotation nest 130 may deposit the cleaned mobile user device on the output nest 128.

As shown in FIG. 2H, and by reference number 235, as the plate nest support stage 122 exits the cleaning station 108, the mobile user device may pass under the defrost heater assembly 146, which blows hot air on the lower portion of the mobile user device, warming and drying the mobile user device in preparation for the application of a label. A robotic device may retrieve the cleaned mobile user device and may place another dirty mobile user device on the input nest 126 and the cycle may repeat.

In this way, the cleaning station 108 provides automated cleaning of mobile user devices. For example, the cleaning station 108 may be designed to work with a robotic device and a carbon dioxide dry ice pellet source to clean mobile user devices. The dry ice pellet cleaning process utilized by the cleaning station 108 may make the mobile user devices look practically brand new for reuse in a secondary mobile user device market. Thus, the cleaning station 108 may conserve computing resources, machinery resources, and/or other resources that would have otherwise been consumed by manually cleaning mobile user devices, failing to clean certain portions of ports, keys, seams, and/or the like of the mobile user devices, failing to support cleaning of some models of mobile user devices, and/or the like.

As indicated above, FIGS. 2A-2H are provided as an example. Other examples may differ from what is described with regard to FIGS. 2A-2H. The number and arrangement of devices shown in FIGS. 2A-2H are provided as an example. In practice, there may be additional devices, fewer devices, different devices, or differently arranged devices than those shown in FIGS. 2A-2H. Furthermore, two or more devices shown in FIGS. 2A-2H may be implemented within a single device, or a single device shown in FIGS. 2A-2H may be implemented as multiple, distributed devices. Additionally, or alternatively, a set of devices (e.g., one or more devices) shown in FIGS. 2A-2H may perform one or more functions described as being performed by another set of devices shown in FIGS. 2A-2H.

Figure 3:
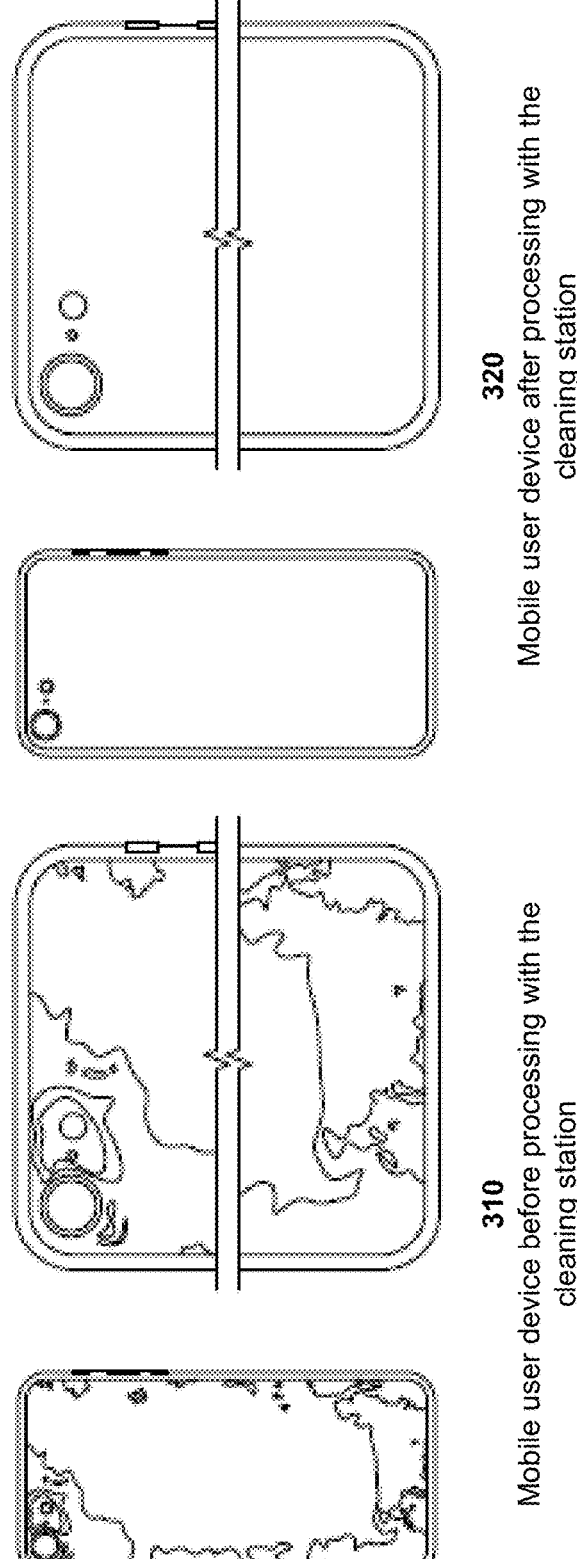
FIG. 3 is a diagram of an example mobile user device before and after processing with the cleaning system of FIGS. 1A-1F.

FIG. 3 is a diagram of an example mobile user device before and after processing with the cleaning system of FIGS. 1A-1F. As shown by reference number 310, the mobile user device before processing with the cleaning station 108 may include dirt, dust, oil, and/or the like. As shown by reference number 320, the mobile user device after processing with the cleaning station 108 may cleaned of the dirt, the dust, the oil, and/or the like. The dry ice pellet cleaning process utilized by the cleaning station 108 may make the mobile user device look practically brand new for reuse in a secondary mobile user device market.

Figure 4:
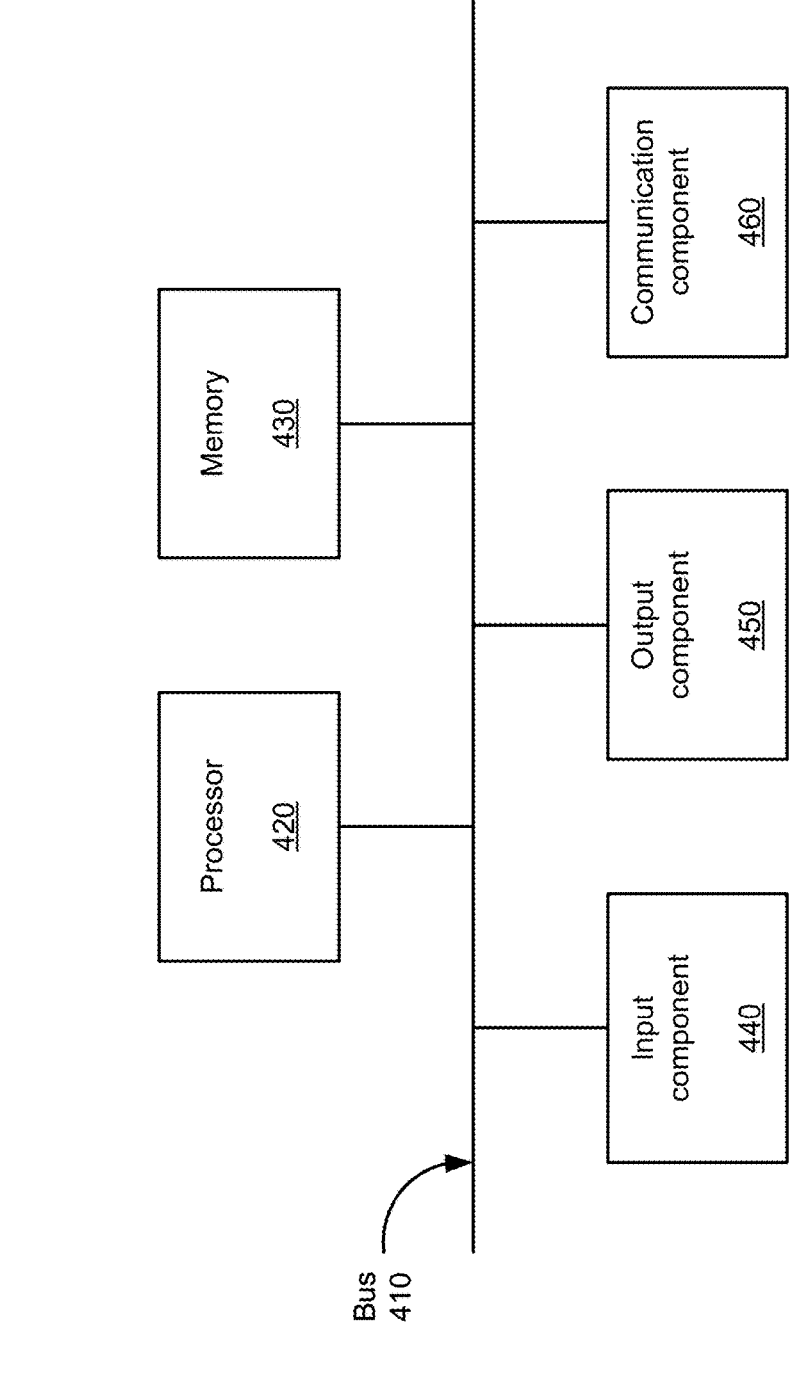
FIG. 4 is a diagram of example components of one or more devices of FIGS. 1A-1F.

FIG. 4 is a diagram of example components of a device 400, which may correspond to the carbon dioxide dry ice blasting machine 102, the dust collection system 104, the cleaning station 108, and/or the user device 148. In some implementations, the carbon dioxide dry ice blasting machine 102, the dust collection system 104, the cleaning station 108, and/or the user device 148 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
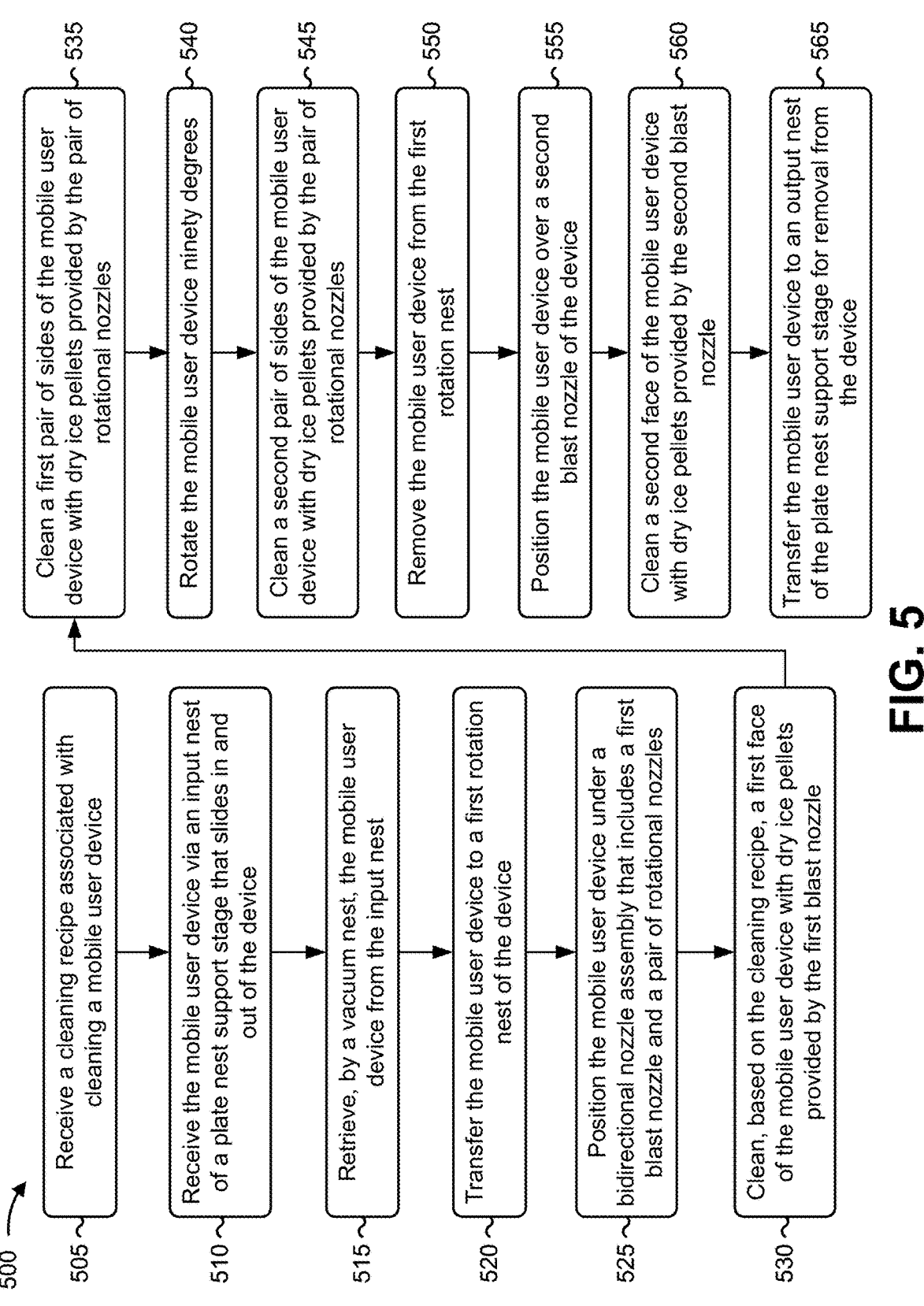
FIG. 5 is a flowchart of an example process for automated cleaning of mobile user devices.

FIG. 5 is a flowchart of an example process 500 for automated cleaning of mobile user devices. In some implementations, one or more process blocks of FIG. 5 may be performed by a device (e.g., the cleaning station 108). In some implementations, one or more process blocks of FIG. 5 may be performed by another device or a group of devices separate from or including the device, such as a carbon dioxide dry ice blasting machine (e.g., the carbon dioxide dry ice blasting machine 102), a dust collection system (e.g., the dust collection system 104), and/or a user device (e.g., the user device 148). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving a cleaning recipe associated with cleaning a mobile user device (block 505). For example, the device may receive a cleaning recipe associated with cleaning a mobile user device, as described above. In some implementations, the mobile user device is a mobile telephone or a tablet computer.

As further shown in FIG. 5, process 500 may include receiving the mobile user device via an input nest of a plate nest support stage that slides in and out of the device (block 510). For example, the device may receive the mobile user device via an input nest of a plate nest support stage that slides in and out of the device, as described above. In some implementations, the plate nest support stage slides in and out of the device along a base pneumatic slide of the device. In some implementations, receiving the mobile user device via the input nest includes utilizing a robotic device to provide the mobile user device to the input nest.

As further shown in FIG. 5, process 500 may include retrieving, by a vacuum nest, the mobile user device from the input nest (block 515). For example, the vacuum nest of the device may retrieve the mobile user device from the input nest, as described above.

As further shown in FIG. 5, process 500 may include transferring the mobile user device to a first rotation nest of the device (block 520). For example, the device may transfer the mobile user device to a first rotation nest of the device, as described above.

As further shown in FIG. 5, process 500 may include positioning the mobile user device under a bidirectional nozzle assembly, of the device, that includes a first blast nozzle and a pair of rotational nozzles (block 525). For example, the device may position the mobile user device under a bidirectional nozzle assembly, of the device, that includes a first blast nozzle and a pair of rotational nozzles, as described above.

As further shown in FIG. 5, process 500 may include cleaning, based on the cleaning recipe, a first face of the mobile user device with dry ice pellets provided by the first blast nozzle (block 530). For example, the device may clean, based on the cleaning recipe, a first face of the mobile user device with dry ice pellets provided by the first blast nozzle, as described above.

As further shown in FIG. 5, process 500 may include cleaning a first pair of sides of the mobile user device with dry ice pellets provided by the pair of rotational nozzles (block 535). For example, the device may clean a first pair of sides of the mobile user device with dry ice pellets provided by the pair of rotational nozzles, as described above.

As further shown in FIG. 5, process 500 may include rotating the mobile user device ninety degrees (block 540). For example, the device may rotate the mobile user device ninety degrees, as described above.

As further shown in FIG. 5, process 500 may include cleaning a second pair of sides of the mobile user device with dry ice pellets provided by the pair of rotational nozzles (block 545). For example, the device may clean a second pair of sides of the mobile user device with dry ice pellets provided by the pair of rotational nozzles, as described above.

As further shown in FIG. 5, process 500 may include removing the mobile user device from the first rotation nest (block 550). For example, the device may remove the mobile user device from the first rotation nest, as described above.

As further shown in FIG. 5, process 500 may include positioning the mobile user device over a second blast nozzle of the device (block 555). For example, the device may position the mobile user device over a second blast nozzle of the device, as described above.

As further shown in FIG. 5, process 500 may include cleaning a second face of the mobile user device with dry ice pellets provided by the second blast nozzle (block 560). For example, the device may clean a second face of the mobile user device with dry ice pellets provided by the second blast nozzle, as described above. In some implementations, the cleaning recipe includes information associated with one or more of a movement speed of the mobile user device under the bidirectional nozzle assembly, a clearance space of the pair of rotational nozzles, blasting pressures of the first blast nozzle, the pair of rotational nozzles, and the second blast nozzle, dry ice pellet sizes provided by the first blast nozzle, the pair of rotational nozzles, and the second blast nozzle, or dry ice pellet feed rates provided to the first blast nozzle, the pair of rotational nozzles, and the second blast nozzle.

As further shown in FIG. 5, process 500 may include transferring the mobile user device to an output nest of the plate nest support stage for removal from the device (block 565). For example, the device may transfer the mobile user device to an output nest of the plate nest support stage for removal from the device, as described above.

In some implementations, process 500 includes drying a portion of the mobile user device via a defrost heater assembly prior to removing the mobile user device from the device. In some implementations, process 500 includes applying a label to the portion of the mobile user device. In some implementations, process 500 includes receiving another mobile user device via the input nest. In some implementations, process 500 includes utilizing a robotic arm to remove the mobile user device from the output nest. In some implementations, process 500 includes connecting, via a tray area, the bidirectional nozzle assembly and the second blast nozzle to a source of the dry ice pellets.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:
1. A cleaning station, comprising:
a plate nest support stage that supports an input nest and an output nest and is configured to slide in and out of the cleaning station;
the input nest configured to receive a mobile user device;
a vacuum nest configured to retrieve the mobile user device from the input nest and to transfer the mobile user device to a first rotation nest of the cleaning station;
the first rotation nest configured to position the mobile user device under a bidirectional nozzle assembly of the cleaning station;
a first blast nozzle, of the bidirectional nozzle assembly, configured to clean, based on a cleaning recipe, a first face of the mobile user device with dry ice pellets;
a pair of rotational nozzles, of the bidirectional nozzle assembly, configured to clean a first pair of sides of the mobile user device with dry ice pellets;
the first rotation nest configured to rotate the mobile user device ninety degrees;
the pair of rotational nozzles configured to clean a second pair of sides of the mobile user device with dry ice pellets;
a second rotation nest configured to remove the mobile user device from the first rotation nest and to position the mobile user device over a second blast nozzle of the cleaning station;
the second blast nozzle configured to clean a second face of the mobile user device with dry ice pellets; and

the second rotation nest configured to transfer the mobile user device to the output nest for removal from the cleaning station.
2. The cleaning station of claim 1, further comprising:
a base pneumatic slide along which the plate nest support stage slides in and out of the cleaning station.
3. The cleaning station of claim 1, further comprising:
a defrost heater assembly configured to dry a portion of the mobile user device prior to removal of the mobile user device from the cleaning station.
4. The cleaning station of claim 1, wherein the cleaning recipe includes information associated with one or more of:
movement speed of the mobile user device under the bidirectional nozzle assembly,
a clearance space of the pair of rotational nozzles,
blast pressures of the first blast nozzle, the pair of rotational nozzles, and the second blast nozzle,
dry ice pellet sizes provided by the first blast nozzle, the pair of rotational nozzles, and the second blast nozzle, or
dry ice pellet feed rates provided to the first blast nozzle, the pair of rotational nozzles, and the second blast nozzle.
5. The cleaning station of claim 1, wherein the input nest is further configured to receive another mobile user device.
6. The cleaning station of claim 1, wherein the mobile user device is a mobile telephone or a tablet computer.
7. The cleaning station of claim 1, further comprising:
a tray area configured to connect the bidirectional nozzle assembly and the second blast nozzle to a source of dry ice pellets.
8. A system comprising:
a dry ice pellet blasting machine; and
a cleaning station comprising:
a plate nest support stage that supports an input nest and an output nest and is configured to slide in and out of the cleaning station;
the input nest configured to receive, based on a cleaning recipe, a mobile user device;
a vacuum nest configured to retrieve the mobile user device from the input nest and to transfer the mobile user device to a first rotation nest of the cleaning station;
the first rotation nest configured to position the mobile user device under a bidirectional nozzle assembly of the cleaning station;
a first blast nozzle, of the bidirectional nozzle assembly, configured to clean a first face of the mobile user device with dry ice pellets received from the dry ice pellet blasting machine;
a pair of rotational nozzles, of the bidirectional nozzle assembly, configured to clean a first pair of sides of the mobile user device with dry ice pellets received from the dry ice pellet blasting machine;
the first rotation nest configured to rotate the mobile user device ninety degrees;
the pair of rotational nozzles configured to clean a second pair of sides of the mobile user device with dry ice pellets received from the dry ice pellet blasting machine;
a second rotation nest configured to remove the mobile user device from the first rotation nest and to position the mobile user device over a second blast nozzle of the cleaning station;
the second blast nozzle configured to clean a second face of the mobile user device with dry ice pellets; and the second rotation nest configured to transfer the mobile user device to the output nest for removal from the cleaning station.

9. The system of claim 8, wherein the cleaning station further comprises:

a base pneumatic slide along which the plate nest support stage slides in and out of the cleaning station.

10. The system of claim 8, wherein the cleaning station further comprises:

a defrost heater assembly configured to dry a portion of the mobile user device prior to removal of the mobile user device from the cleaning station.

11. The system of claim 10, further comprising:

a dust collection system configured to collect dust generated by the dry ice pellet blasting machine.

12. The system of claim 8, wherein the input nest includes a stage for supporting the mobile user device.

13. The system of claim 8, wherein the cleaning station further comprises:

a tray area configured to connect the bidirectional nozzle assembly and the second blast nozzle to the dry ice pellet blasting machine.

14. A system, comprising:

a plate nest support stage that supports an input nest and an output nest and is configured to slide in and out of the system;

the input nest configured to receive a mobile user device;

a vacuum nest configured to retrieve the mobile user device from the input nest and to transfer the mobile user device to a first rotation nest of the system;

the first rotation nest configured to position the mobile user device under a bidirectional nozzle assembly of the system;

a first blast nozzle, of the bidirectional nozzle assembly, configured to clean, based on a cleaning recipe, a first face of the mobile user device with dry ice pellets;

a pair of rotational nozzles, of the bidirectional nozzle assembly, configured to clean a first pair of sides of the mobile user device with dry ice pellets;

the first rotation nest configured to rotate the mobile user device ninety degrees; and the pair of rotational nozzles configured to clean a second pair of sides of the mobile user device with dry ice pellets.

15. The system of claim 14, further comprising:

a second rotation nest configured to remove the mobile user device from the first rotation nest and to position the mobile user device over a second blast nozzle of the system;

the second blast nozzle configured to clean a second face of the mobile user device with dry ice pellets; and the second rotation nest configured to transfer the mobile user device to the output nest for removal from the system.

16. The system of claim 14, further comprising:

a base pneumatic slide along which the plate nest support stage slides in and out of the system.

17. The system of claim 14, further comprising:

a defrost heater assembly configured to dry a portion of the mobile user device prior to removal of the mobile user device from the system.

18. The system of claim 14, wherein the cleaning recipe includes information associated with one or more of:

movement speed of the mobile user device under the bidirectional nozzle assembly, a clearance space of the pair of rotational nozzles, blast pressures of the first blast nozzle, the pair of rotational nozzles, and a second blast nozzle, dry ice pellet sizes provided by the first blast nozzle, the pair of rotational nozzles, and the second blast nozzle, or dry ice pellet feed rates provided to the first blast nozzle, the pair of rotational nozzles, and the second blast nozzle.

19. The system of claim 14, wherein the mobile user device is a mobile telephone or a tablet computer, and wherein the input nest is further configured to receive another mobile user device.

20. The system of claim 14, further comprising:

a tray area configured to connect the bidirectional nozzle assembly and a second blast nozzle to a source of dry ice pellets.

* * * * *